United States Patent [19]

Still et al.

[11] Patent Number: 5,572,527

[45] Date of Patent: Nov. 5, 1996

[54] SYSTEM FOR LINE-CONDUCTED DIGITAL DATA TELECOMMUNICATIONS

[75] Inventors: Michael Still, Langenhagen; Ziaedin Chahabadi, Bad Münder, both of Germany

[73] Assignee: KE Kommunikations-Elektronik GmbH & Co., Hanover, Germany

[21] Appl. No.: 232,521

[22] Filed: Apr. 22, 1994

[30] Foreign Application Priority Data

Apr. 23, 1993 [DE] Germany ............................. 43 13 340.1
Feb. 3, 1994 [DE] Germany ............................. 44 03 319.2

[51] Int. Cl.$^6$ ...................................................... H04J 3/02
[52] U.S. Cl. ............................ 370/85.7; 370/67; 370/80; 370/85.9; 359/163
[58] Field of Search ............................ 370/85.7, 14, 94.1, 370/95.1, 84, 85.1, 80, 95.3, 67; 359/152, 163

[56] References Cited

U.S. PATENT DOCUMENTS

| | | | |
|---|---|---|---|
| 4,046,964 | 9/1977 | Daugherty et al. ................... | 370/14 |
| 4,768,188 | 8/1988 | Barnhart et al. ...................... | 370/80 |
| 4,970,721 | 11/1990 | Aczel et al. ......................... | 370/94.1 |
| 5,307,347 | 4/1994 | Duault et al. ........................ | 370/85.7 |

FOREIGN PATENT DOCUMENTS

| | | | |
|---|---|---|---|
| 0437350 | 7/1991 | European Pat. Off. | ....... H04Q 11/04 |
| 0481170 | 4/1992 | European Pat. Off. | ....... H04Q 11/04 |

OTHER PUBLICATIONS

"Opal–Projekt in Stuttgart mit optischen Verstärkern" *Ntz*, vol. 45 (1992), issue 11, pp. 902 and 903.

*Primary Examiner*—Douglas W. Olms
*Assistant Examiner*—Shick Hom
*Attorney, Agent, or Firm*—Ware, Fressola, Van Der Sluys & Adolphson

[57] ABSTRACT

A system for line-conducted digital telecommunication between a switching exchange of a telecommunication network and a subscriber connected to this network is provided. The digital transmission path passes to a transfer point accessible for the subscriber, to which the subscriber may connect his devices by free choice up to the full use of the maximum available transfer rate. The activation of the particular transfer rates are controllable by the switching exchange.

12 Claims, 2 Drawing Sheets

SYSTEM FOR LINE-CONDUCTED DIGITAL DATA TELECOMMUNICATIONS

BACKGROUND OF THE INVENTION

The present invention generally relates to a system for line-conducted digital data transmission and, in particular, relates to one such system including a transfer point accessible to the subscriber whereat a digital transmission path is immediately and directly available the subscriber.

In general, arrangements for lead-conducted digital data telecommunication between a switching exchange of a telecommunication network and a subscriber connected to this network are known from the German magazine "ntz" vol. 45 (1992), issue 11, pages 902 and 903.

Digital telecommunication technology with its attendant advantages over analog technology, for example, by the provision of a larger range and a high transfer rate, is becoming more widely used in the telecommunication field. In general, there are many digital telecommunication technology services that may be used by subscribers of a modern telecommunication network. Typically these include such devices as telephone, telefax, telex, teletex, IDN and ISDN basis connections and primary multiplex connections. As a result, the subscriber connection portion of the network, generally referred to as the subscriber loop, is of special importance.

Such a subscriber loop with the name "Opal" for a pilot project of the DBP Telecom is described in the German magazine "ntz" VOL. 45 (1992), issue 11, pages 902 and 903. Therein, a selected number of subscribers are connected to the switching exchange via glass fibers or light waveguides. Therein, a light waveguide passes from the switching exchange to a remote optical line concentrator, from which it passes to the buildings and to a service access point. In this passive subscriber loop the light signal power is divided according to the number of subscribers connected to the subscriber loop. Hence, there is a limit to the number of subscribers that can be connected to the loop. In addition, such a system is adapted for use with lasers having wavelengths of, for example, between 1330 nm or 1550 nm. Additionally, the particular devices of the subscribers, such as telephone and data terminals, are connected by analog means to so-called line terminal equipment, wherein a digital to analog conversion occurs and wherein the transfer rate provided to the subscriber is set. The line terminal equipment of such a system is not accessible to the subscriber. Consequently, if a subscriber wishes to make changes on or to the devices available to him, for example, to connect an additional device, the change must be performed by specialists who are able and qualified to carry out the necessary switching work in the line terminal equipment. This is time consuming and expensive.

Consequently, it is highly desirable to provide a line-conducted digital data telecommunication system that is not subject to such limitations.

SUMMARY OF THE INVENTION

Accordingly, one object of the present invention is to provide a system for line-conducted digital data telecommunication such that the advantages of digital communication may be used more efficiently.

This object is accomplished, at least in part, by extending a digital transmission path to a transfer point that is accessible to the subscriber and to which the subscriber may selectively connect devices by free choice up to the full use of the maximum available transfer rate and by integrating channel assignment means that are controllable by the switching exchange to provide the particular data transfer rates.

By such an arrangement, each and every subscriber is able to connect devices to his own transfer point by himself up to a full use of a transfer rate of e.g. 2.56 Mbit/s. In order to connect a new device to the transfer point, the subscriber only has to acquire a compatible adapter that provides corresponding interface signals. The required transfer rate is then made available by the switching exchange by means of corresponding control signals for the channel assignment means. This may be done in a very short period of time. For example, the change in the required transfer rate can be made available within the time it takes the subscriber to return home from buying the adapter. Consequently, the need for specialists to accomplish this task is overcome.

In one preferred configuration of the invention, the digital transmission path is extended up to the transfer point for every subscriber. Therefore, all subscribers are able to connect devices requiring a digital interface directly to the transfer point by means of the corresponding adapter. Further, a bus may be provided at the transfer point, to which the digital devices may be connected in parallel to each other. In addition, analog devices can be connected by corresponding adapters having digital to analog converters. Such converters may also be integrated into the corresponding devices such as telephones.

Either light waveguides or electrical wires may be exclusively used between the switching exchange and the transfer point. In the preferred embodiment, light waveguides are used between the switching exchange and the service access points, which are located proximate the subscriber. At least one subscriber but usually several subscribers are connected to the service access points by means of electrical leads. The service access points include channel assignment means.

The transfer of signals between the switching exchange and the subscriber works bidirectionally. The maximum transfer rate for the transmission path connected to the switching exchange may be, for example, 34 Mbit/s. Typically, for example, 40 channels with a transfer rate of 64 kbit/s each, but minimally, at least 2.56 Mbit/s, may be offered to the subscriber. The channels can then be assigned to the subscriber via the channel assignment means. After installation, the channels are then available to the subscriber, but are only connected up, i.e., activated, as needed.

Other objects and advantages will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
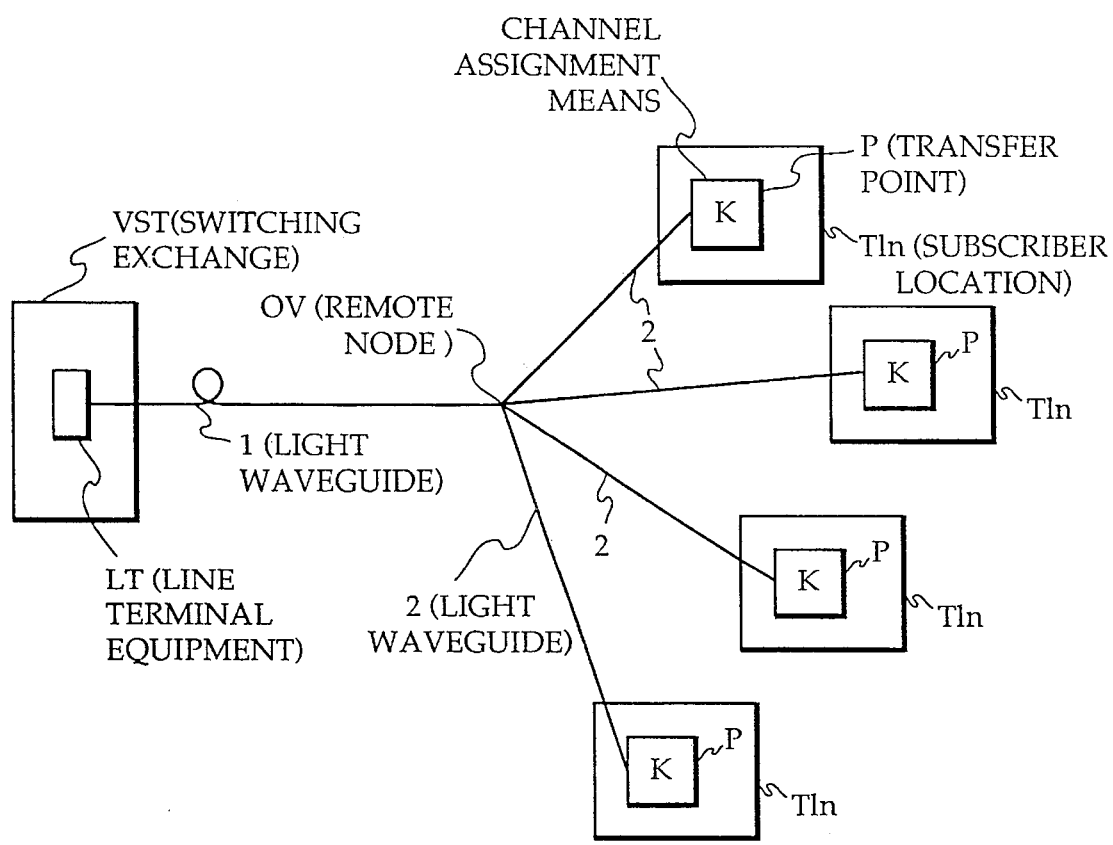
FIG. 1 which is a block diagram of a system for line-conducted digital data telecommunications embodying the principles of the present invention.

A system for line-conducted digital data telecommunications is shown in FIG. 1 and includes a light, or optical, waveguide i which is distributed into several light, optical, waveguides at a remote node OV at one end thereof and is connected to a switching exchange VST of a telecommunication network at the other end thereof. As shown in FIG. 1, a plurality of light, or optical, waveguides 2 extend between the remote node OV and a plurality of subscribers Tln. Each light waveguide 2 has a subscriber Tln connected thereto. Although only four light waveguides 2 are shown between the remote node OV and the subscribers Tln, any number of such light waveguides 2 may be used. Within the switching exchange VST the light waveguide 1 is connected to a line terminal equipment LT. The line terminal equipment LT includes, among other equipment, an electrical to optical converter. Typically, signals with a maximum transfer rate of, for example, 34 Mbit/s may be transmitted via the light waveguide 1.

Each of the light waveguides 2 terminates at a transfer point P proximate the subscriber Tln location. A digital interface is provided to each subscriber Tln at the transfer point P and is available to the subscriber Tln whereat the subscriber Tln may connect devices up to a maximum transfer rate of, for example, 2.56 Mbit/s. For each device to be connected, the subscriber Tln uses an adapter as a service unit SU that provides the requisite interface signals for the device. In addition, channel assignment means are installed that are controlled by corresponding signals from the switching exchange VST. The channel assignment means are used for connecting and assigning the channels and transfer rates that are provided to the transfer point P.

Alternatively, instead of light waveguide 1 and light waveguide 2, electrical leads may also be used, such electrical leads would at least include two wire leads. Even in such an alternative arrangement, the digital transfer paths would nonetheless pass to the transfer points P.

Figure 3:
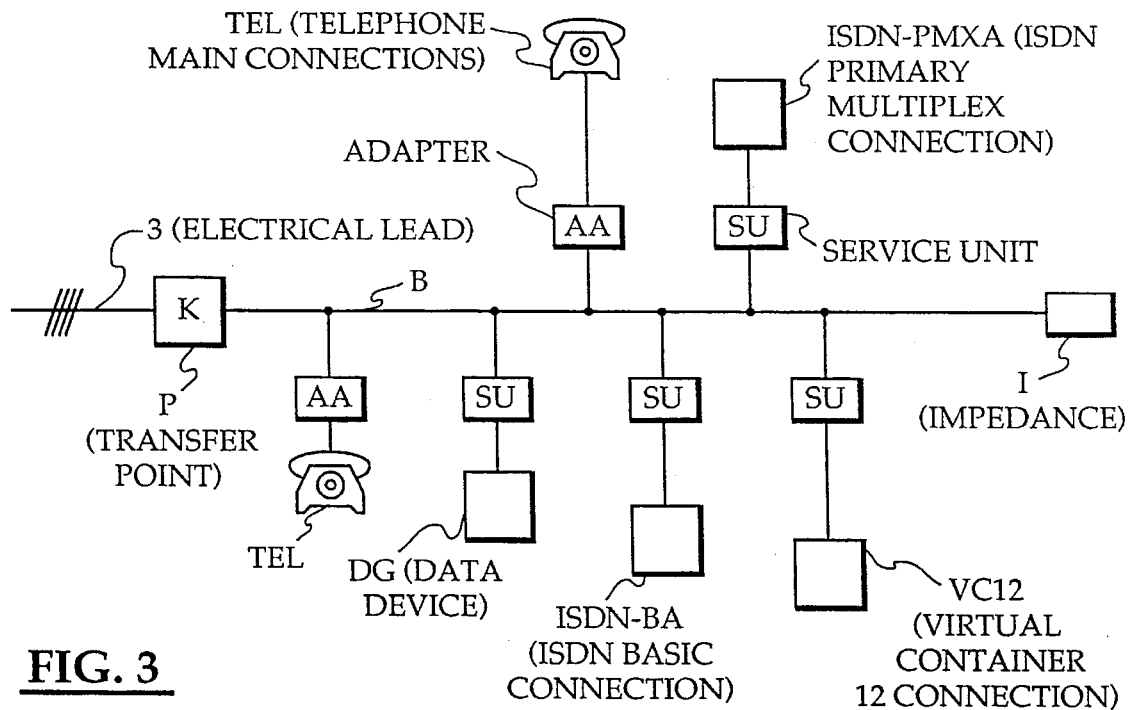
FIG. 3 which is a more detailed block diagram of a subscriber system configuration.

As described hereinafter, for example, the arrangement according to FIG. 1 is preferably adapted to operate in conjunction with the configuration shown in FIG. 3.

As shown therein, from the transfer point P of each subscriber Tln a bus B, terminating on end with an impedance I, is provided to which the devices to be used by the subscriber Tln may be connected. These devices may include, for example, telephone main connections TEL, data devices DG, ISDN basic connection ISDN-BA, ISDN primary multiplex connection ISDN-PMXA and also connections for VT-2 (SONET Payload) or VC12 (SDH Payload), as indicated in FIG. 3. The transfer rates and channels respectively required for the operation of the devices are generally provided at the transfer point P. Thus, the transfer rates and channels only have to be activated as and if required.

In general, in implementing the present system, the majority of subscribers Tln will initially only have a connection for one analog telephone TEL. The telephone TEL is connected to the switching exchange VST by means of an analog adapter AA and the transfer point P functions as a digital interface. The adapter AA performs the analog to digital conversion and may also be integrated in the device TEL. For this particular type of connection generally a channel with a transfer rate of 64 kbit/s is sufficient. As further devices are to be connected, further channels have to be activated.

The activation is preferably performed by the channel assignment means K. The required control command for the activation is preferably transmitted by the switching exchange VST. In this fashion, a subscriber Tln may obtain as many services as the number of channels and the transfer rate respectively provided at the transfer point P allow.

To obtain an activation, the subscriber Tln would only need to acquire an adapter with the specific service unit SU suitable to the particular device. Such a service unit or adapter would then be connected to the bus B by the subscriber Tln at the subscriber's premises.

Figure 2:
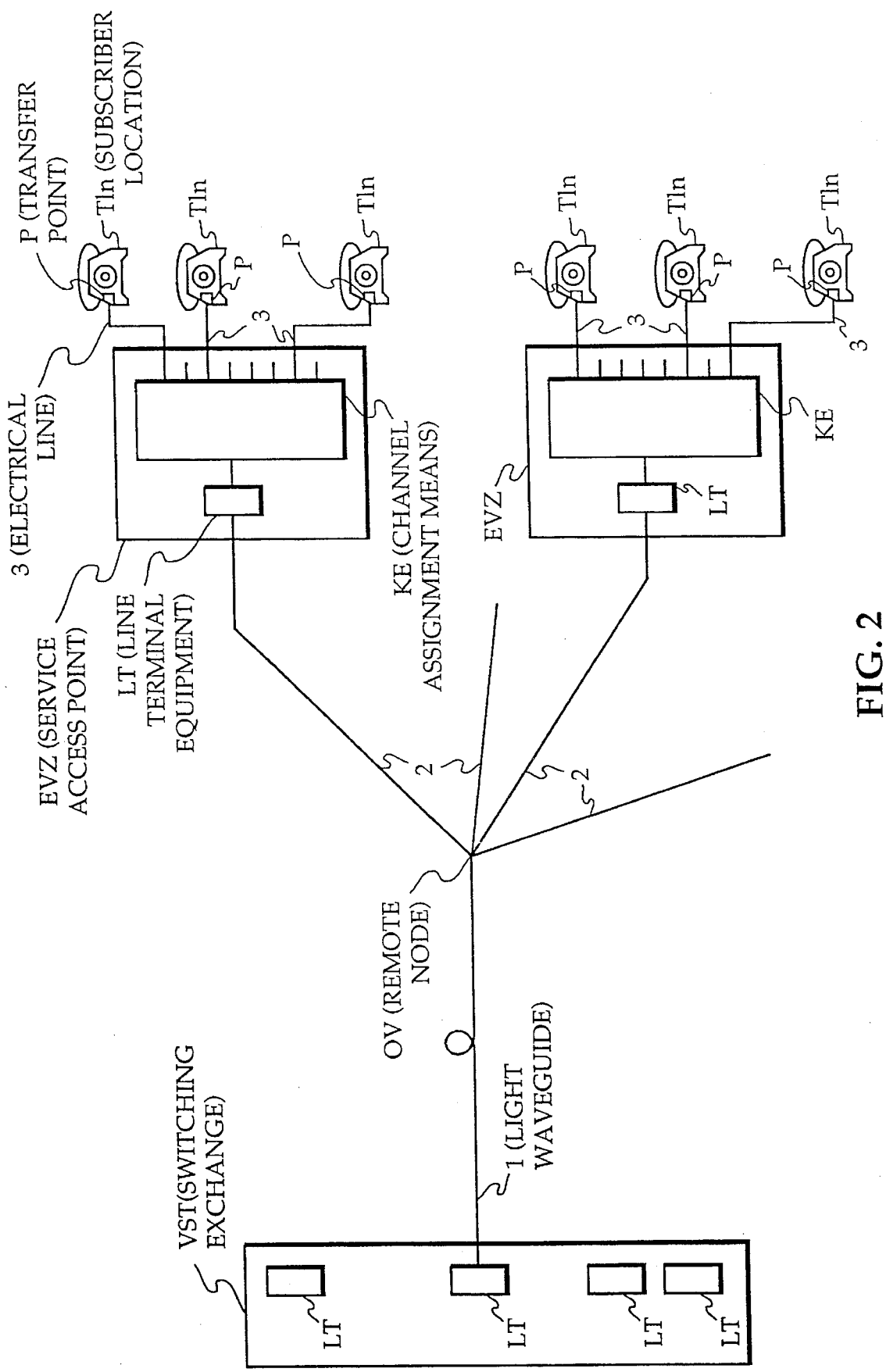
FIG. 2 which is another system for line-conducted digital data telecommunication also embodying the principles of the present invention.

In another embodiment, the system is configured as shown in FIG. 2. In this embodiment, the light waveguides 1 and 2 extend between the switching exchange VST to the service access points EVZ. The number of light waveguides 2 and, consequently the number of service access points EVZ may be the same as shown in the embodiment shown in FIG. 1. In the embodiment shown in FIG. 2, the subscribers Tln are connected to the service access point EVZ by means of electrical leads 3. In such an arrangement, the electrical leads include at least two wire leads.

Each of the light waveguides Z terminates at one of the service access point EVZ. Therein the light waveguides Z are connected to a line terminal equipment LT. Preferably, the service access point EVZ are active service access points and are supplied with active, electrically working components. Each of the service access point EVZ includes a channel assignment means KE, to which a number of subscribers Tln are connected. In the specific embodiment shown in FIG. 2, for every service access point EVZ there are eight subscriber connections. However, there may also be more or less than eight subscribers Tln. Each service access point EVZ is located proximate at least one of the subscribers Tln. The service access point EVZ are then connected to each of the subscribers Tln by the electrical leads 3. Because the service access point EVZ is relatively close to the subscribers Tln the electrical leads 3 may be kept short. The electrical leads 3 terminate at the transfer point P, wherein in this case no channel assignment means is required.

Each subscriber Tln is, as previously discussed, connected to the service access point EVZ by at least one pair of electrical wire, i.e., a two wire lead. Preferably, two pairs of core are installed. Measures for direction separation, for example compensation of echoes, are not required.

Fundamentally, in the embodiment shown in FIG. 2, instead of the light waveguides 1 and 2 electrical leads may alternatively be used.

The transfer of digital telecommunication signals with the arrangement according to FIG. 2 is, for example, carried out as follows:

The digital signals are transmitted to the service access point EVZ via the light waveguide 1 and 2. Preferably, high quality laser diodes are used as transmitters and receivers in the line terminal equipment LT of the switching exchange VST and the service access point EVZ. Preferably, single mode optical fibers are used for the light waveguide 1 and 2. Therefore, the signals between switching exchange VST and service access point EVZ may be transferred satisfactorily with the intended transfer rate of for example 34 Mbit/s. This not only applies to the common distances in the subscriber loop but larger distances between the switching exchange VST and the service access point EVZ may also be connected without the use of additional or special optical amplifiers. As a result, the number of switching exchanges VST in a network may be decreased.

The subscribers Tln are connected to the service access point EVZ and the channel assignment means KE respectively, by electrical leads 3. Because the service access points EVZ are installed proximate at least one subscriber Tln it is ensured that the electrical wires can be short enough to transfer the digital signals with the intended maximum transfer rate of about 2.56 Mbit/s between the service access point EVZ and the transfer point P.

In the preferred embodiment, 40 channels each having 64 kbit/s capacity are provided to every subscriber connected to the service access point EVZ. This equals a transfer rate of 2.56 Mbit/s that each subscriber Tln could fully exploit, if he wants to use an corresponding number of the provided services. To do so, the subscriber Tln has to connect his devices, as already described for FIG. 1, by means of adequate adapters to his transfer point P and therefrom to the starting bus B, respectively.

The arrangement according to FIG. 2 offers as a further advantage, that a check of the transfer paths and of the function of all installed circuits and components, respectively, is possible by means of an adequately constructed digital transmitter. To this end, the check of the loop a connection of the transfer paths may be carried out in the transfer points P of the subscriber Tln.

For completeness, it will be understood that the given transfer rates between the switching exchange VST and the subscriber Tln and between the switching exchange VST and the service access point EVZ respectively set forth herein, only characterize the general magnitude of available transfer rates. Such transfer rates, depending on the requirements, may be higher or lower. This also applies to the total transfer rate provided to the subscriber Tln.

Although the present invention has been described and discussed with respect to one or more specific embodiments it will be understood that other arrangements or configurations may also be used that do not depart from the spirit and scope of the present invention. Hence, the present invention is deemed limited only by the appended claims and the reasonable interpretation thereof.

What is claimed is:

1. A system for line-conducted digital data telecommunications between a switching exchange of a telecommunication network and subscribers connected to said telecommunication network, said system comprising:

a digital transmission path for connecting each of said subscribers with a respective subscriber transfer point, so each of said subscribers can selectively connect devices for providing different services by free choice up to the full use of a maximum available transfer rate; and each of said subscribers having a respective channel assignment means for communicating with the respective subscriber transfer point for switching respective transfer rates depending on individual services used by the subscribers, said channel assignment means being controllable by said switching exchange.

2. The system as claimed in claim 1, further including a bus, said bus being connected to said transfer point of each of said subscribers, said devices of a subscriber being connected in parallel to said bus by interposing adapters that provide interface signals dedicated to each of said devices.

3. The system as claimed in claim 1, wherein said switching exchange and each of said respective subscriber transfer point is connected by light waveguides.

4. The system as claimed in claim 3 wherein said channel assignment means are installed in said transfer points.

5. The system as claimed in claim 1 wherein said channel assignment means are installed in said transfer points.

6. The system as claimed in claim 1 wherein;

optical waveguides are connected between said switching exchange and service access points, said service access points being disposed proximate to said subscribers; and said respective subscriber transfer point of said subscribers are connected to said service access points by means of electrical leads.

7. The system as claimed in claim 1, wherein said switching exchange and service access points, which are placed proximate to said subscribers, are connected by electrical leads; and said transfer points of said subscribers are connected to said service access points by electrical leads.

8. The system as claimed in claim 6, wherein said electrical leads are at least two wire leads.

9. The system as claimed in claim 7, wherein said electrical leads are at least two wire leads.

10. The system as claimed in claim 8, wherein said channel assignment means are disposed in said transfer points.

11. The system as claimed in claim 7, wherein said channel assignment means are disposed in said service access points.

12. The system as claimed in claim 6, wherein said channel assignment means are disposed in said service access points.

* * * * *